United States Patent
Kanzaki et al.

(10) Patent No.: US 7,765,087 B2
(45) Date of Patent: Jul. 27, 2010

(54) SYSTEM PERFORMANCE PROFILING DEVICE INTEGRATED INSIDE A SYSTEM-ON-CHIP

(75) Inventors: Hideyuki Kanzaki, Hyogo (JP); Kozo Nishimura, Osaka (JP); Yoshihisa Tanaka, Shiga (JP)

(73) Assignee: Panasonic Corporation, Osaka (JP)

( * ) Notice: Subject to any disclaimer, the term of this patent is extended or adjusted under 35 U.S.C. 154(b) by 367 days.

(21) Appl. No.: 11/887,485

(22) PCT Filed: Apr. 7, 2006

(86) PCT No.: PCT/JP2006/307463

§ 371 (c)(1),
(2), (4) Date: Sep. 28, 2007

(87) PCT Pub. No.: WO2006/109728

PCT Pub. Date: Oct. 19, 2006

(65) Prior Publication Data

US 2009/0254310 A1    Oct. 8, 2009

(30) Foreign Application Priority Data

Apr. 11, 2005    (JP) ............................. 2005-113209

(51) Int. Cl.
*G06F 11/30*    (2006.01)
*G06F 11/00*    (2006.01)

(52) U.S. Cl. .................. 702/186; 702/117; 702/118; 702/182; 714/30; 714/47

(58) Field of Classification Search ............... 702/186, 702/117, 118, 182

See application file for complete search history.

(56) References Cited

U.S. PATENT DOCUMENTS

| 5,581,778 | A   | * | 12/1996 | Chin et al. ..................... 712/16 |
| 7,003,763 | B2  |   | 2/2006  | Sudo et al. |
| 2002/0049893 | A1 | * | 4/2002 | Williams et al. .............. 712/11 |
| 2002/0059511 | A1 |   | 5/2002 | Sudo et al. |
| 2006/0010307 | A1 | * | 1/2006 | Williams ..................... 712/227 |

FOREIGN PATENT DOCUMENTS

| JP | 2-144737 | 6/1990 |
| JP | 5-120456 | 5/1993 |
| JP | 3158425 | 2/2001 |
| JP | 2002-149442 | 5/2002 |

OTHER PUBLICATIONS

International Search Report issued Jul. 18, 2006 in the International (PCT) Application of which the present application is the U.S. National Stage.

* cited by examiner

*Primary Examiner*—Hal D Wachsman
(74) *Attorney, Agent, or Firm*—Wenderoth, Lind & Ponack, L.L.P.

(57) ABSTRACT

A system performance profiling device is provided inside a system-on-chip (SoC). Selectors respectively select values of predetermined bit positions of counters and output the selected values to the outside of the system-on-chip, during a period of acquisition of profiling data. When the acquisition of the profiling data ends, the selectors respectively select values of all lower bit positions of the counters than the predetermined bit positions, and output the selected values to the outside of the system-on-chip.

8 Claims, 11 Drawing Sheets

FIG. 2

| | DRIVE UNIT | | CONDITION |
|---|---|---|---|
| | MASTER | SLAVE | |
| COMMAND | mcomreq | scomacceptable | mcomreq & scomacceptable |
| WRITE DATA | mwvalid | swdtacceptable | mwvalid & swdtacceptable |
| READ DATA | mrdtacceptable | srvalid | mrdtacceptable & srvalid |

FIG. 4

| TARGET TRANSACTION | FILTER SETTING MASK SIGNAL | r/W FILTER SETTING SIGNAL |
|---|---|---|
| READ AND WRITE | 1 (High) | — |
| READ | 0 (Low) | 1 (High) |
| WRITE | 0 (Low) | 0 (Low) |

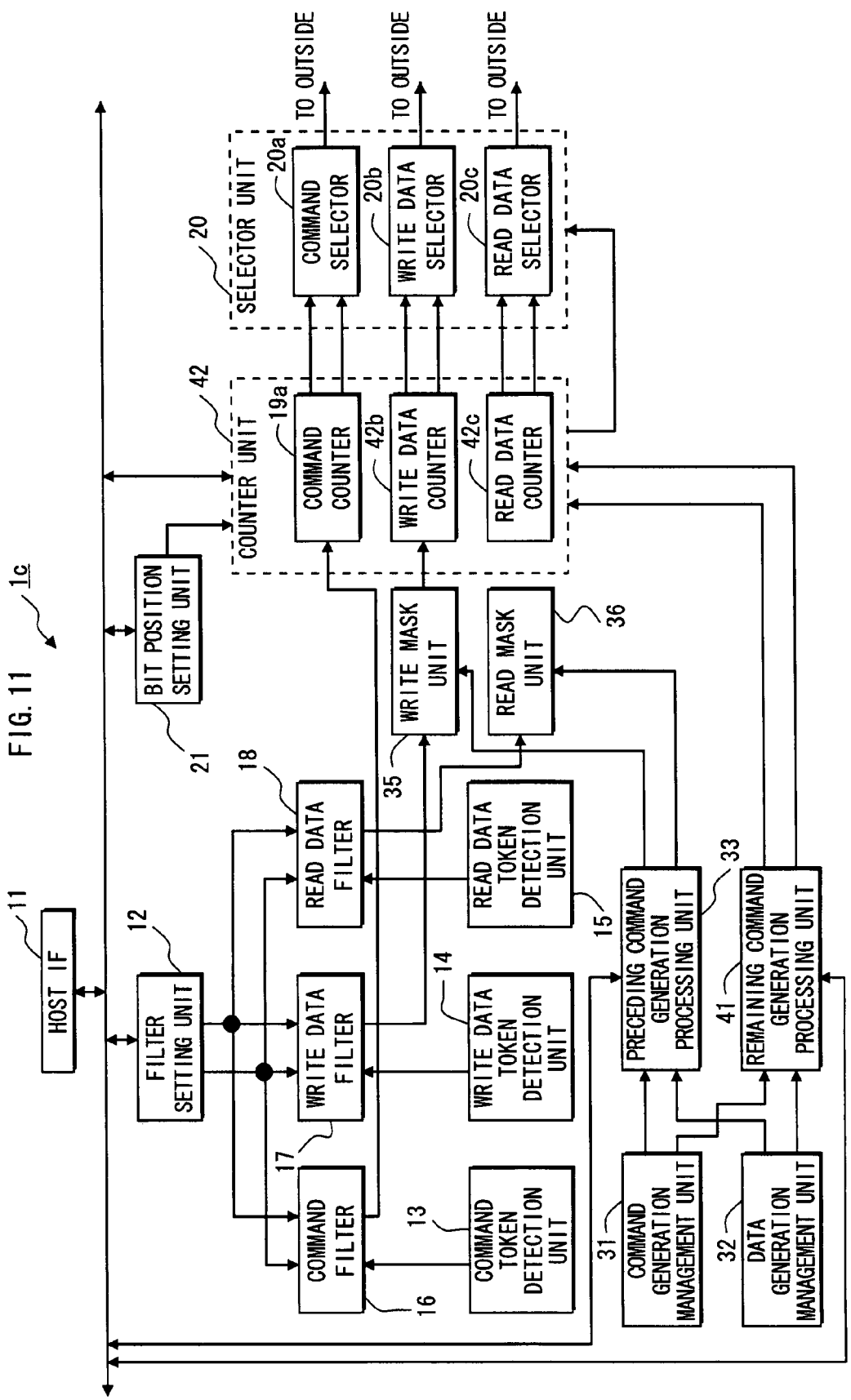

US 7,765,087 B2

SYSTEM PERFORMANCE PROFILING DEVICE INTEGRATED INSIDE A SYSTEM-ON-CHIP

TECHNICAL FIELD

The present invention relates to system performance evaluation techniques for large-scale, multifunctional semiconductor integrated circuits (SoC: System on Chip).

BACKGROUND ART

SoCs used for home appliances represented by digital audio visual (AV) devices have advantages of not only realizing cost reductions by reducing the number of chips through integration of multiple functions onto one chip, but also realizing improvements in overall system performance by including newly-created system control architectures and bus architectures.

On the other hand, SoCs have a disadvantage that it is difficult to evaluate system performance of a SoC using an actual object, since an on-chip bus is hidden inside the SoC.

To address this disadvantage, there is a method of evaluating system performance of a SoC by outputting signals on an on-chip bus inside the SoC to the outside and observing the signals on the on-chip bus outside (e.g. Japanese patent application publication No. 2002-149442, published on May 24, 2002).

However, this method is problematic in that, if the on-chip bus inside the SoC is speeded up, development man-hours and difficulty of suppressing wiring variations inside the SoC increase significantly, and the number of signal lines of signals to be output to the outside becomes too large to secure necessary output terminals.

In view of this, there is another method that, instead of observing the signals themselves on the on-chip bus inside the SoC, observes occurrences of an event under a specific condition of a bus transaction, updates a counter value of a counter equipped in the SoC using pulse signals showing the event occurrences to thereby obtain event occurrence count information, outputs the event occurrence count information to outside the SoC, and evaluates the system performance of the SoC based on the output event occurrence count information (e.g. Japanese patent No. 3158425, published on Feb. 16, 2001).

DISCLOSURE OF THE INVENTION

Problems the Invention is Going to Solve

However, this method has the following problem. As a period for observing event occurrences for the SoC system performance evaluation becomes longer, the number of event occurrences increases. To observe event occurrences for a long period of time, it is necessary to increase a resource of the counter (the number of counter bits). The increase in the counter resource causes a rise in unit price of SoCs.

Another problem of the method is that, since a maximum number of event occurrences that can be counted by the counter during the event occurrence observation period is fixed, there is a restriction on the event occurrence observation period.

In view of the above problems, the present invention aims to provide a system performance profiling device that is provided inside a SoC and can remove the restriction on the period for acquiring the number of event occurrences, without an increase in counter resource.

Means of Solving the Problems

The stated aim can be achieved by a system performance profiling device that monitors a signal on a bus inside a system-on-chip, acquires profiling data for evaluating system performance of the system-on-chip, and outputs the profiling data to an outside of the system-on-chip, the system performance profiling device including: a command detection unit operable to detect a command occurrence by monitoring the signal on the bus; a data detection unit operable to detect a data transfer by monitoring the signal on the bus; a first counter unit operable to count a number of command occurrences based on a result of the detection by the command detection unit; a second counter unit operable to count a number of data transfers based on a result of the detection by the data detection unit; a first selector unit operable to output a value of a first bit position, which is one bit position of the first counter unit, to the outside during a period of acquisition of the profiling data, and output a value of each lower bit position of the first counter unit than the first bit position to the outside after the acquisition of the profiling data ends; and a second selector unit operable to output a value of a second bit position, which is one bit position of the second counter unit, to the outside during the period of the acquisition of the profiling data, and output a value of each lower bit position of the second counter unit than the second bit position to the outside after the acquisition of the profiling data ends.

Effects of the Invention

According to the above system performance profiling device, the first selector unit outputs the value of the first bit position of the first counter unit to the outside during the acquisition of the profiling data, and outputs the value of each lower bit position of the first counter unit than the first bit position to the outside after the acquisition of the profiling data ends. Also, the second selector unit outputs the value of the second bit position of the second counter unit to the outside during the acquisition of the profiling data, and outputs the value of each lower bit position of the second counter unit than the second bit position to the outside after the acquisition of the profiling data ends. Accordingly, in a case where a counter for performing a counting operation based on the value of the first bit position output from the first selector unit and a counter for performing a counting operation based on the value of the second bit position output from the second selector unit are provided outside the SoC in which the system performance profiling device is equipped, a countable number of command occurrences and a countable number of data transfers can be increased by having the first counter unit and the second counter unit operate in conjunction with the outside counters. As a result, the restriction on the profiling data acquisition period due to the first counter unit and the second counter unit can be removed without an increase in counter resource of the first counter unit and the second counter unit. Also, since each of the first selector unit and the second selector unit is constructed to switch its output, the system performance profiling device can be realized with a smaller number of pins.

Here, the system performance profiling device may further include: a bit position setting unit operable to set the first bit position of the first counter unit.

According to this construction, the first bit position of the first counter unit that is to be output to the outside by the first selector unit can be changed. Therefore, an occurrence frequency distribution based on a small number of command occurrences can be obtained depending on, for example, operation capabilities of an external device and the like.

Here, the system performance profiling device may further include: a bit position setting unit operable to set the second bit position of the second counter unit.

According to this construction, the second bit position of the second counter unit that is to be output to the outside by the second selector unit can be changed. Therefore, an occurrence frequency distribution based on a small number of data transfers can be obtained depending on, for example, operation capabilities of an external device and the like.

Here, the system performance profiling device may further include: a counting suppression unit operable to suppress the counting by the second counter unit, until data transfers corresponding to all commands that occur before the acquisition of the profiling data starts are completed.

According to this construction, the second counter unit starts counting the number of data transfers after data transfers corresponding to all commands occurring before the acquisition of the profiling data starts are completed. Thus, the acquisition start timing can be made arbitrary, with it being possible to evaluate access overhead performance in terms of an average burst length.

Here, after the acquisition of the profiling data ends, the second selector unit may output a number of commands corresponding to data transfers that have not been completed at a time when the acquisition of the profiling data ends, to the outside before or after outputting the value of each lower bit position of the second counter unit than the second bit position.

Here, after the acquisition of the profiling data ends, the first selector unit may output a number of commands corresponding to data transfers that have not been completed at a time when the acquisition of the profiling data ends, to the outside before or after outputting the value of each lower bit position of the first counter unit than the first bit position.

According to these constructions, the second selector unit or the first selector unit outputs the number of commands corresponding to data transfers which have not been completed when the acquisition of the profiling data ends, to the outside after the acquisition of the profiling data ends. Thus, the acquisition end timing can be made arbitrary, with it being possible to evaluate access overhead performance in terms of an average burst length.

Here, the data detection unit and the second counter unit may continue respective operations until data transfers corresponding to all commands that occur after the acquisition of the profiling data starts are completed, wherein the second selector unit outputs the value of the second bit position to the outside until the data transfers corresponding to all commands that occur after the acquisition of the profiling data starts are completed, and outputs the value of each lower bit position of the second counter unit than the second bit position to the outside after the data transfers corresponding to all commands that occur after the acquisition of the profiling data starts are completed.

According to this construction, the profiling data acquisition period is extended until the data transfers corresponding to all commands are completed, as far as the data transfer detection and the data transfer counting operation are concerned. Thus, the acquisition end timing can be made arbitrary, with it being possible to evaluate access overhead performance in terms of an average burst length.

Here, the system performance profiling device may further include: a condition setting unit operable to set a condition for a bus transaction that is subjected to the acquisition of the profiling data, wherein the first counter unit counts a number of occurrences of commands that satisfy the condition set by the condition setting unit, and the second counter unit counts a number of data transfers that satisfy the condition set by the condition setting unit.

According to this construction, it is possible to determine the condition for the bus transaction that is subjected to the acquisition of the profiling data. This enables, for instance, the system performance to be evaluated by using only write transactions or by using only read transactions.

BRIEF DESCRIPTION OF THE DRAWINGS

FIG. 2 shows token conditions.

FIG. 4 shows each signal output from a filter setting unit shown in FIG. 3.

FIG. 11 shows a construction of a system performance profiling device according to the fourth embodiment.

DESCRIPTION OF REFERENCE NUMERALS

Figure 1:
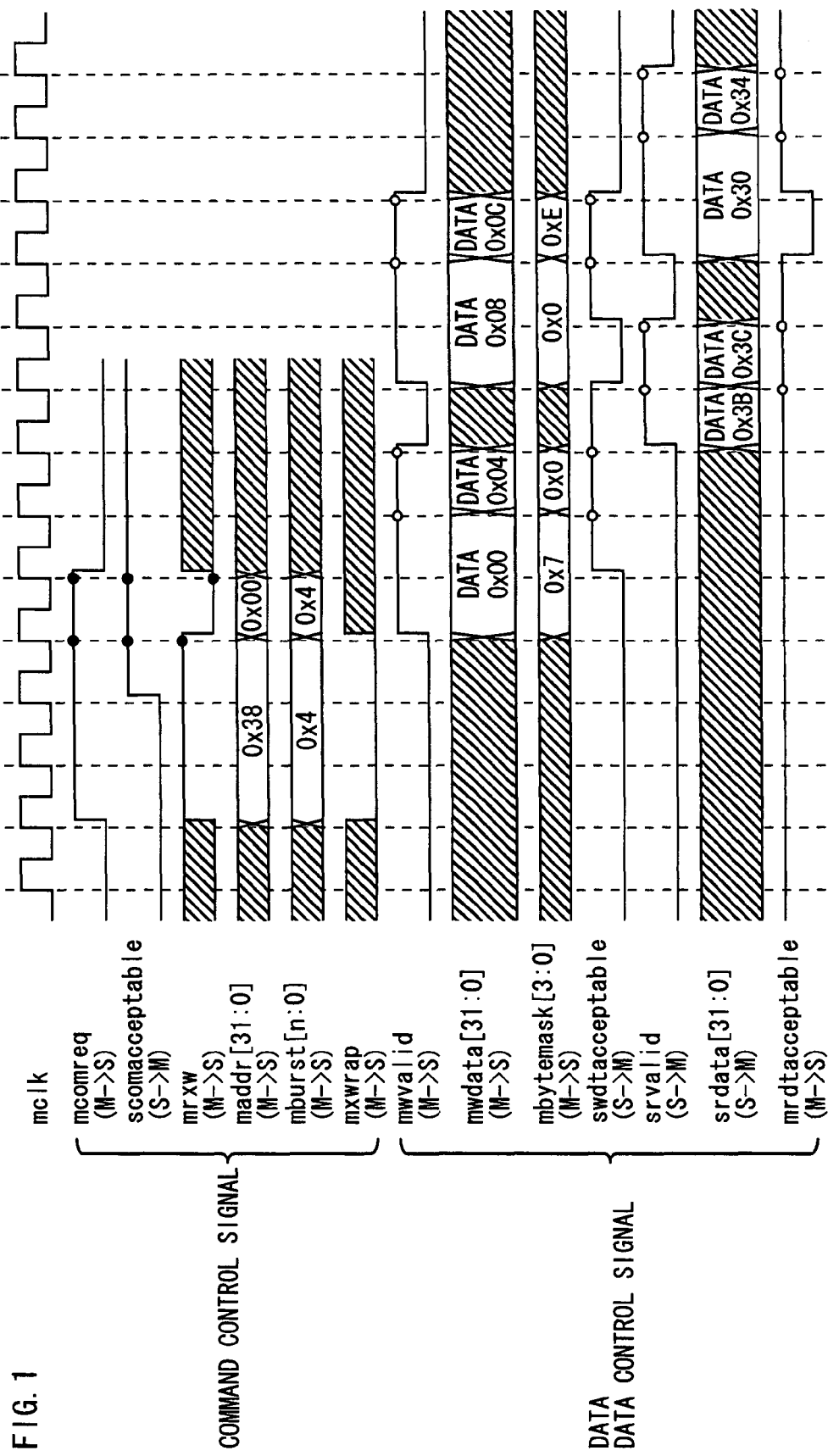
FIG. 1 shows signals on an on-chip bus according to first and second embodiments.

1 . . . system performance profiling device
12 . . . filter setting unit
13 . . . command token detection unit
14 . . . write data token detection unit
15 . . . read data token detection unit
16 . . . command filter
17 . . . write data filter
18 . . . read data filter
19 . . . counter unit
19$a$ . . . command counter
19$b$ . . . write data counter
19$c$ . . . read data counter
20 . . . selector unit
20$a$ . . . command selector
20$b$ . . . write data selector
20$c$ . . . read data selector

BEST MODE FOR CARRYING OUT THE INVENTION

First Embodiment

The following describes a first embodiment of the present invention, with reference to drawings.

In the first embodiment and the embodiments that follow, a system performance profiling device is integrated inside a SoC. The system performance profiling device acquires a number of occurrences of commands for a transaction that satisfies a predetermined condition among bus transactions occurring on an on-chip bus inside the SoC, and a number of data transfers that satisfy the predetermined condition. The system performance profiling device outputs information on these numbers to the outside as profiling data for evaluating system performance. Here, the system performance profiling device uses a write transaction and a read transaction.

<Signals on an On-Chip Bus and Token Detection>

The following describes signals on an on-chip bus, establishment of a command token, establishment of a write data token, and establishment of a read data token, with reference to FIGS. 1 and 2. FIG. 1 shows signals on an on-chip bus, to which the first embodiment and a second embodiment relate. FIG. 2 shows conditions for a command token, a write data token, and a read data token.

In FIG. 1, (m->s) denotes a signal from a master to a slave, whilst (s->m) denotes a signal from a slave to a master.

FIG. 1 shows an example of a 16-byte wrap read access from address 0x38 (4 burst reads with a 4-byte bus) and a 10-byte write access from address 0x03 (4 burst writes with a 4-byte bus). The same applies to FIG. 8 described later.

(Command Token)

Two signals, namely, a command request signal mcomreq and a command acceptability signal scomacceptable, are used to detect a command token. A command token is detected at a leading edge of a master clock signal mclk when both of the signals mcomreq and scomacceptable are high, and an event signal (hereafter referred to as a command event signal) is generated upon the detection.

Also, a read write signal mrxw is used to specify whether the generated command event signal relates to a read command or a write command. The command event signal generated when the read write signal mrxw is high relates to the read command. The command event signal generated when the read write signal mrxw is low relates to the write command.

(Data Token)

A write valid signal mwvalid and a write data acceptability signal swdtacceptable are used to detect a write data token. A write data token is detected at a leading edge of the master clock signal mclk when both of the signals mwvalid and swdtacceptable are high, and an event signal (hereafter referred to as a write data event signal) is generated upon the detection.

A read valid signal srvalid and a read data acceptability signal mrdtacceptable are used to detect a read data token. A read data token is detected at a leading edge of the master clock signal mclk when both of the signals srvalid and mrdtacceptable are high, and an event signal (hereafter referred to as a read data event signal) is generated upon the detection.

<Construction>

Figure 3:
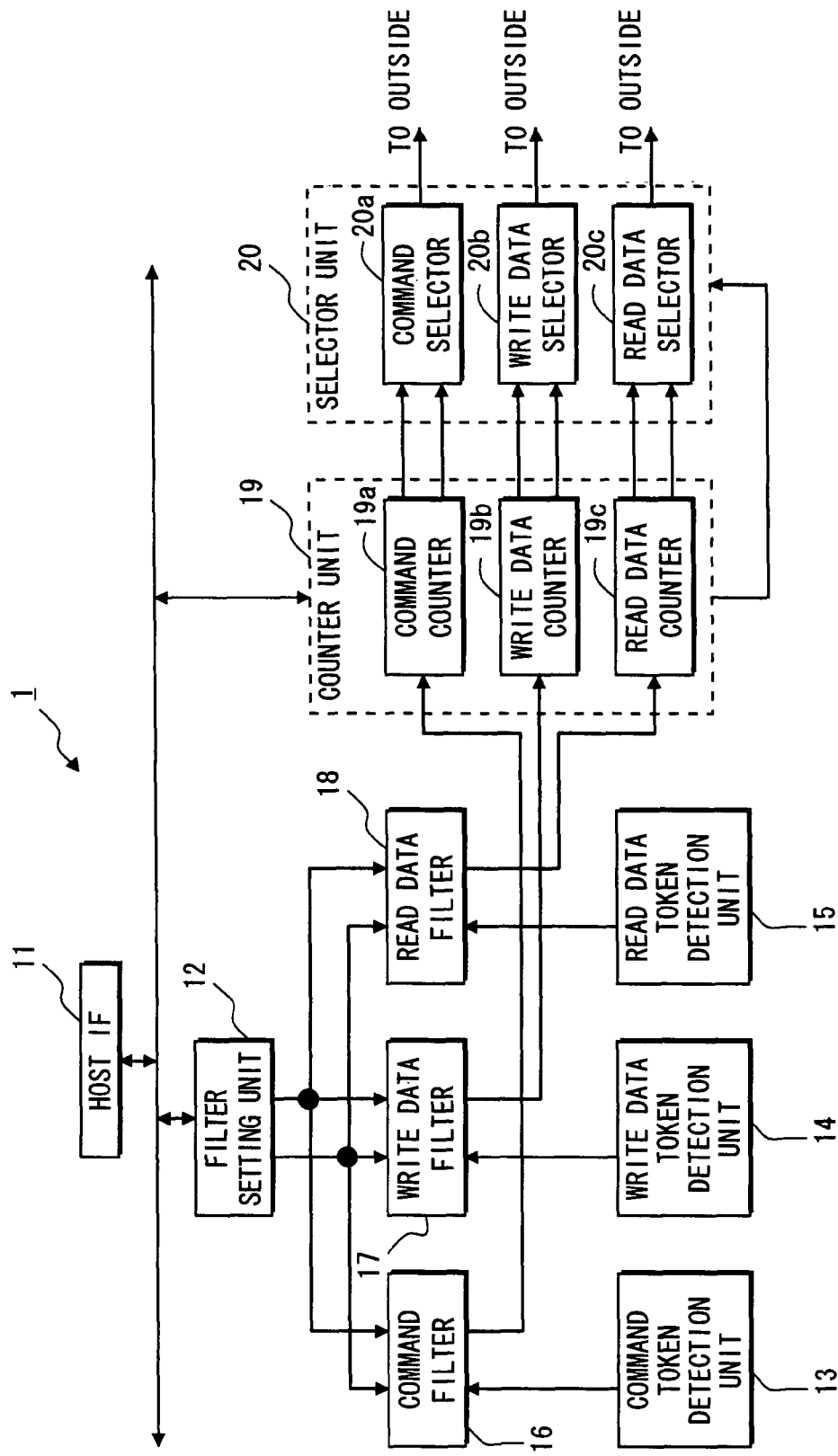
FIG. 3 shows a construction of a system performance profiling device according to the first embodiment.

A construction of the system performance profiling device according to the first embodiment is described below, with reference to FIG. 3. FIG. 3 shows the construction of the system performance profiling device according to the first embodiment.

A system performance profiling device 1 includes a host IF (interface) 11, a filter setting unit 12, a command token detection unit 13, a write data token detection unit 14, a read data token detection unit 15, a command filter 16, a write data filter 17, a read data filter 18, a counter unit 19, and a selector unit 20.

The host IF 11 is an interface for connecting the system performance profiling device 1 to an external device.

The filter setting unit 12 sets a filter parameter designated via the host IF 11, in each of the command filter 16, the write data filter 17, and the read data filter 18. There are three types of filter parameters that are the counting of events of write transactions only, the counting of events of read transactions only, and the counting of events of both write transactions and read transactions.

When setting the filter parameter, the filter setting unit 12 uses a filter setting mask signal and a R/W filter setting signal. FIG. 4 shows relations between each filter parameter and the filter setting mask signal and the R/W filter setting signal.

Figure 5:
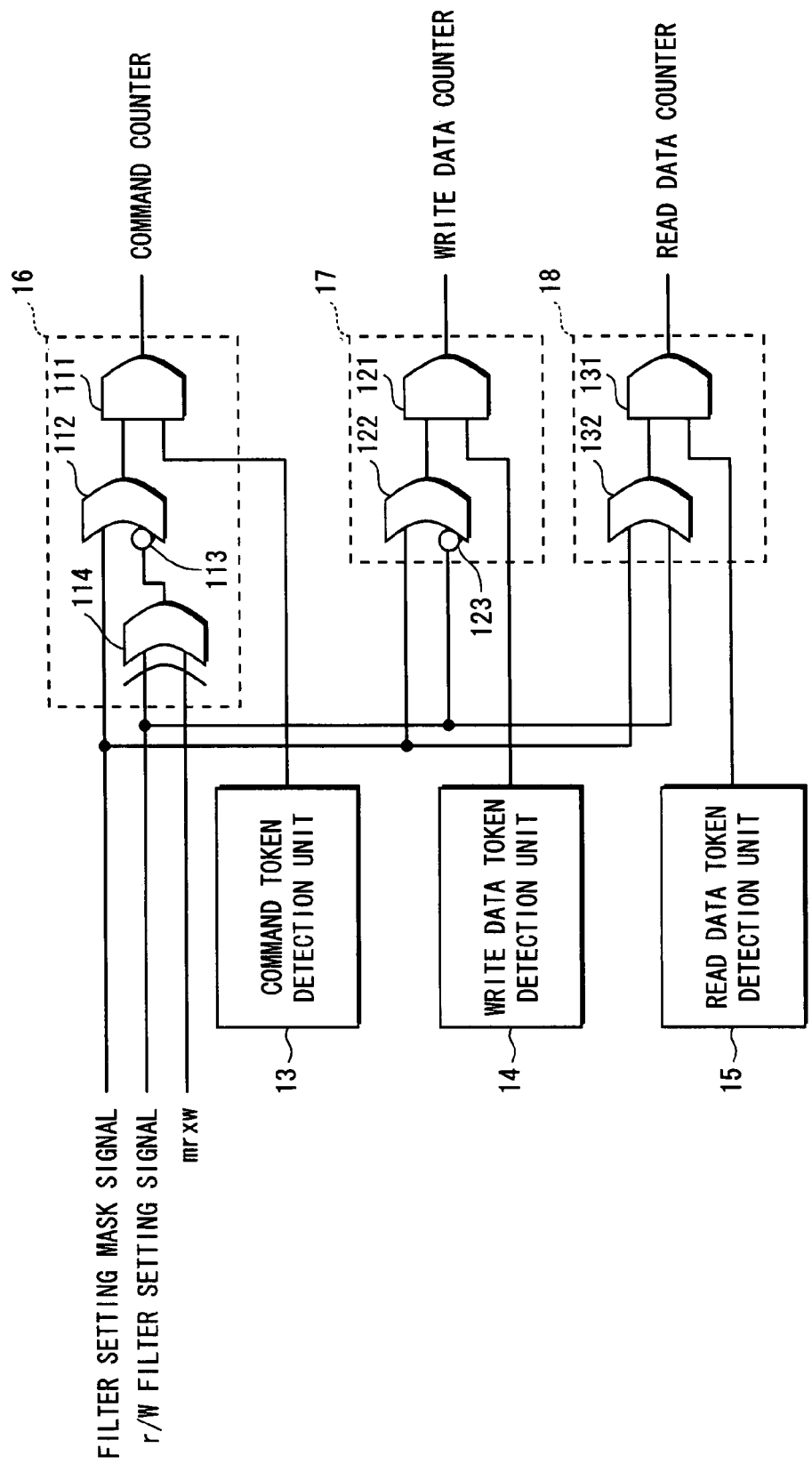
FIG. 5 shows each filter in FIG. 3 by logic circuits.

A specific structure of filtering of each event signal using the filter setting mask signal and the R/W filter setting signal will be described later with reference to FIG. 5.

The command token detection unit 13 detects a command token at a leading edge of the master clock mclk when both the command request signal mcomreq and the command acceptability signal scomacceptable are high, and generates a command event signal which is a pulse signal. The command token detection unit 13 outputs the generated command event signal to the command filter 16.

The write data token detection unit 14 detects a write data token at a leading edge of the master clock mclk when both the write valid signal mwvalid and the write data acceptability signal swdtacceptable are high, and generates a write data event signal which is a pulse signal. The write data token detection unit 14 outputs the generated write data event signal to the write data filter 17.

The read data token detection unit 15 detects a read data token at a leading edge of the master clock mclk when both the read valid signal srvalid and the read data acceptability signal mrdtacceptable are high, and generates a read data event signal which is a pulse signal. The read data token detection unit 15 outputs the generated read data event signal to the read data filter 18.

The command filter 16 outputs, among command event signals input from the command token detection unit 13, a command event signal of a command that satisfies a condition shown by the filter parameter set by the filter setting unit 12, to a circuit block of a subsequent stage. A specific filter construction will be described later with reference to FIG. 5.

The write data filter 17 outputs a write data event signal input from the write data token detection unit 14 to a circuit block of a subsequent stage, when the filter parameter set by the filter setting unit 12 is the counting of events of write transactions only or the counting of events of both write transactions and read transactions. A specific filter construction will be described later with reference to FIG. 5.

The read data filter 18 outputs a read data event signal input from the read data token detection unit 15 to a circuit block of a subsequent stage, when the filter parameter set by the filter setting unit 12 is the counting of events of read transactions only or the counting of events of both write transactions and read transactions. A specific filter construction will be described later with reference to FIG. 5.

The counter unit 19 includes a command counter 19a, a write data counter 19b, and a read data counter 19c. Each counter starts a counting operation when an acquisition start signal to start acquisition of profiling data for evaluating system performance is input from the host IF 11, and stops the counting operation when an acquisition end signal is input from the host IF 11.

The command counter 19a increases its counter value by 1 at a leading edge of the command event signal input from the command filter 16. The command counter 19a outputs a value of a predetermined bit position (hereafter referred to as a first output bit position) and values (hereafter referred to as a first output counter value) of all bit positions lower than the first output bit position, to a command selector 20a.

The write data counter 19b increases its counter value by 1 at a leading edge of the write data event signal input from the write data filter 17. The write data counter 19b outputs a value of a predetermined bit position (hereafter referred to as a second output bit position) and values (hereafter referred to as a second output counter value) of all bit positions lower than the second output bit position, to a data selector 20b.

The read data counter 19c increases its counter value by 1 at a leading edge of the read data event signal input from the read data filter 18. The read data counter 19c outputs a value of a predetermined bit position (hereafter referred to as a third output bit position) and values (hereafter referred to as a third output counter value) of all bit positions lower than the third output bit position, to a data selector 20c.

For example, the first output bit position, the second output bit position, and the third output bit position are each a most significant bit position.

When the acquisition start signal is input from the host IF 11, the counter unit 19 outputs a first selection instruction signal to select the value of the first output bit position, the value of the second output bit position, and the value of the third output bit position, to the selector unit 20. When the acquisition end signal is input from the host IF 11, the counter unit 19 outputs a second selection instruction signal to select the first output counter value, the second output counter value, and the third output counter value, to the selector unit 20.

The selector unit 20 includes the command selector 20a, the write data selector 20b, and the read data selector 20c.

The command selector 20a, when the first selection instruction signal is input from the counter unit 19, selects the value of the first output bit position input from the command counter 19a, and outputs the selected value to the outside. Also, when the second selection instruction signal is input from the counter unit 19, the command selector 20a selects the first output counter value input from the command counter 19a, and outputs the selected value to the outside.

The write data selector 20b, when the first selection instruction signal is input from the counter unit 19, selects the value of the second output bit position input from the write data counter 19b, and outputs the selected value to the outside. Also, when the second selection instruction signal is input from the counter unit 19, the write data selector 20b selects the second output counter value input from the write data counter 19b, and outputs the selected value to the outside.

The read data selector 20c, when the first selection instruction signal is input from the counter unit 19, selects the value of the third output bit position input from the read data counter 19c, and outputs the selected value to the outside. Also, when the second selection instruction signal is input from the counter unit 19, the read data counter 20c selects the third output counter value input from the read data counter 19c, and outputs the selected value to the outside.

<Specific Construction of Each Filter>

The specific constructions of the command filter 16, the write data filter 17, and the read data filter 18 shown in FIG. 3 are described below, with reference to FIG. 5. FIG. 5 shows each filter by logic circuits.

The command filter 16 is constructed of an AND circuit 111, an OR circuit 112, an inverter circuit 113, and an EXOR circuit 114. Connection relations between these circuits are as shown in FIG. 5.

The write data filter 17 is constructed of an AND circuit 121, an OR circuit 122, and an inverter circuit 123. Connection relations between these circuits are as shown in FIG. 5.

The read data filter 18 is constructed of an AND circuit 131 and an OR circuit 132. Connection relations between these circuits are as shown in FIG. 5.

(Circuit Operation of the Command Filter)

When the filter parameter is the counting of events of both write transactions and read transactions, the filter setting mask signal is "1" as shown in FIG. 4.

In this case, the OR circuit 112 outputs "1", which is input to one input terminal of the AND circuit 111. Accordingly, the AND circuit 111 outputs the command event signal output from the command token detection unit 13, directly to the command counter 19a of the subsequent stage. As a result, the command counter 19a counts events of both write transactions and read transactions.

When the filter parameter is the counting of events of write transactions, the filter setting mask signal is "0", and the r/w filter setting signal is "0" (indicating a write command), as shown in FIG. 4.

In this case, if the read write signal mrxw is "0", the EXOR circuit 114 outputs "0", and the inverter circuit 113 outputs "1". The OR circuit 112 outputs "1", which is input to one input terminal of the AND circuit 111. Accordingly, the AND circuit 111 outputs the command event signal output from the command token detection unit 13, directly to the command counter 19a of the subsequent stage.

If the read write signal mrxw is "1", the EXOR circuit 114 outputs "1", and the inverter circuit 113 outputs "0". The OR circuit 112 outputs "0", which is input to one input terminal of the AND circuit 111. Accordingly, the AND circuit 111 masks the command event signal output from the command token detection unit 13, and outputs the masked signal ("0": low level) to the command counter 19a of the subsequent stage.

As a result, the command counter 19a counts events of write transactions only.

When the filter parameter is the counting of events of read transactions, the filter setting mask signal is "0", and the r/w filter setting signal is "1" (indicating a read command), as shown in FIG. 4.

In this case, if the read write signal mrxw is "1", the EXOR circuit 114 outputs "0", and the inverter circuit 113 outputs "1". The OR circuit 112 outputs "1", which is input to one input terminal of the AND circuit 111. Accordingly, the AND circuit 111 outputs the command event signal output from the command token detection unit 13, directly to the command counter 19a of the subsequent stage.

If the read write signal mrxw is "0", the EXOR circuit 114 outputs "1", and the inverter circuit 113 outputs "0". The OR circuit 112 outputs "0", which is input to one input terminal of the AND circuit 111. Accordingly, the AND circuit 111 masks the command event signal output from the command token detection unit 13, and outputs the masked signal ("0": low level) to the command counter 19a of the subsequent stage.

As a result, the command counter 19a counts events of read transactions only.

(Circuit Operation of the Write Data Filter)

When the filter parameter is the counting of events of both write transactions and read transactions, the filter setting mask signal is "1", as shown in FIG. 4.

In this case, the OR circuit 122 outputs "1", which is input to one input terminal of the AND circuit 121. Accordingly, the AND circuit 121 outputs the write data event signal output from the write data token detection unit 14, directly to the write data counter 19b of the subsequent stage. As a result, the write data counter 19b counts events of write transactions.

When the filter parameter is the counting of events of write transactions, the filter setting mask signal is "0", and the r/w filter setting signal is "0", as shown in FIG. 4.

In this case, the inverter circuit 123 outputs "1", and the OR circuit 122 outputs "1", which is input to one input terminal of the AND circuit 121. Accordingly, the AND circuit 121 outputs the write data event signal output from the write data token detection unit 14, directly to the write data counter 19b of the subsequent stage. As a result, the write data counter 19b counts events of write transactions.

When the filter parameter is the counting of events of read transactions, the filter setting mask signal is "0", and the r/w filter setting signal is "1", as shown in FIG. 4.

In this case, the inverter circuit 123 outputs "0", and the OR circuit 122 outputs "0", which is input to one input terminal of the AND circuit 121. Accordingly, the AND circuit 121 masks the write data event signal output from the write data token detection unit 14, and outputs the masked signal ("0": low level) to the write data counter 19b of the subsequent stage.

As a result, the write data counter 19b does not count events of write transactions.

(Circuit Operation of the Read Data Filter)

When the filter parameter is the counting of events of both write transactions and read transactions, the filter setting mask signal is "1", as shown in FIG. 4.

In this case, the OR circuit 132 outputs "1", which is input to one input terminal of the AND circuit 131. Accordingly, the AND circuit 131 outputs the read data event signal output from the read data token detection unit 15, directly to the read data counter 19c of the subsequent stage. As a result, the read data counter 19c counts events of read transactions.

When the filter parameter is the counting of events of read transactions, the filter setting mask signal is "0", and the r/w filter setting signal is "1", as shown in FIG. 4.

In this case, the OR circuit 132 outputs "1", which is input to one input terminal of the AND circuit 131. Accordingly, the AND circuit 131 outputs the read data event signal output from the read data token detection unit 15, directly to the read data counter 19c of the subsequent stage. As a result, the read data counter 19c counts events of read transactions.

When the filter parameter is the counting of events of write transactions, the filter setting mask signal is "0", and the r/w filter setting signal is "0", as shown in FIG. 4.

In this case, the OR circuit 132 outputs "0", which is input to one input terminal of the AND circuit 131. Accordingly, the AND circuit 131 masks the read data event signal output from the read data token detection unit 15, and outputs the masked signal ("0": low level) to the read data counter 19c of the subsequent stage.

As a result, the read data counter 19c does not count events of read transactions.

<Operation>

The following describes an operation of the system performance profiling device 1 shown in FIG. 3.

Information about the filter parameter is input in the filter setting unit 12 from the external device via the host IF 11, and the filter setting unit 12 sets the filter parameter in each of the command filter 16, the write data filter 17, and the read data filter 18. Also, the acquisition start signal to acquire profiling data is input in the counter unit 19 from the external device via the host IF 11, and each counter in the counter unit 19 starts its counting operation. The counter unit 19 outputs the first selection instruction signal to the selector unit 20.

As a result, the command selector 20a selects the value of the first output bit position input from the command counter 19a, and outputs the selected value to the outside. The write data selector 20b selects the value of the second output bit position input from the write data counter 19b, and outputs the selected value to the outside. The read data selector 20c selects the value of the third output bit position input from the read data counter 19c, and outputs the selected value to the outside. This state continues.

The command token detection unit 13, the write data token detection unit 14, and the read data token detection unit 15 respectively perform the command token detection, the write data token detection, and the read data token detection. The command filter 16, the write data filter 17, and the read data filter 18 each perform the filtering operation based on the set filter parameter, and respectively output the command event signal, the write data event signal, and the read data event signal to the circuit blocks of the subsequent stage.

The command counter 19a, the write data counter 19b, and the read data counter 19c respectively perform the counting operations based on the command event signal, the write data event signal, and the read data event signal.

The command selector 20a, the write data selector 20b, and the read data selector 20c respectively select the value of the first output bit position of the command counter 19a, the value of the second output bit position of the write data counter 19b, and the value of the third output bit position of the read data counter 19c, and output the selected values to the outside.

When the acquisition end signal is input in the counter unit 19 from the external device via the host IF 11, each counter in the counter unit 19 stops the counting operation, and the counter unit 19 outputs the second selection instruction signal to the selector unit 20.

As a result, the command selector 20a selects the first output counter value input from the command counter 19a, and outputs the selected value to the outside. The write data selector 20b selects the second output counter value input from the write data counter 19b, and outputs the selected value to the outside. The read data selector 20c selects the third output counter value input from the read data counter 19c, and outputs the selected value to the outside.

Second Embodiment

The following describes the second embodiment of the present invention, with reference to drawings.

The second embodiment adds a mechanism of changing the bit position of each counter that to be output to the outside during the period of acquisition of profiling data for evaluating system performance, to the system performance profiling device 1 of the first embodiment.

<Construction>

Figure 6:
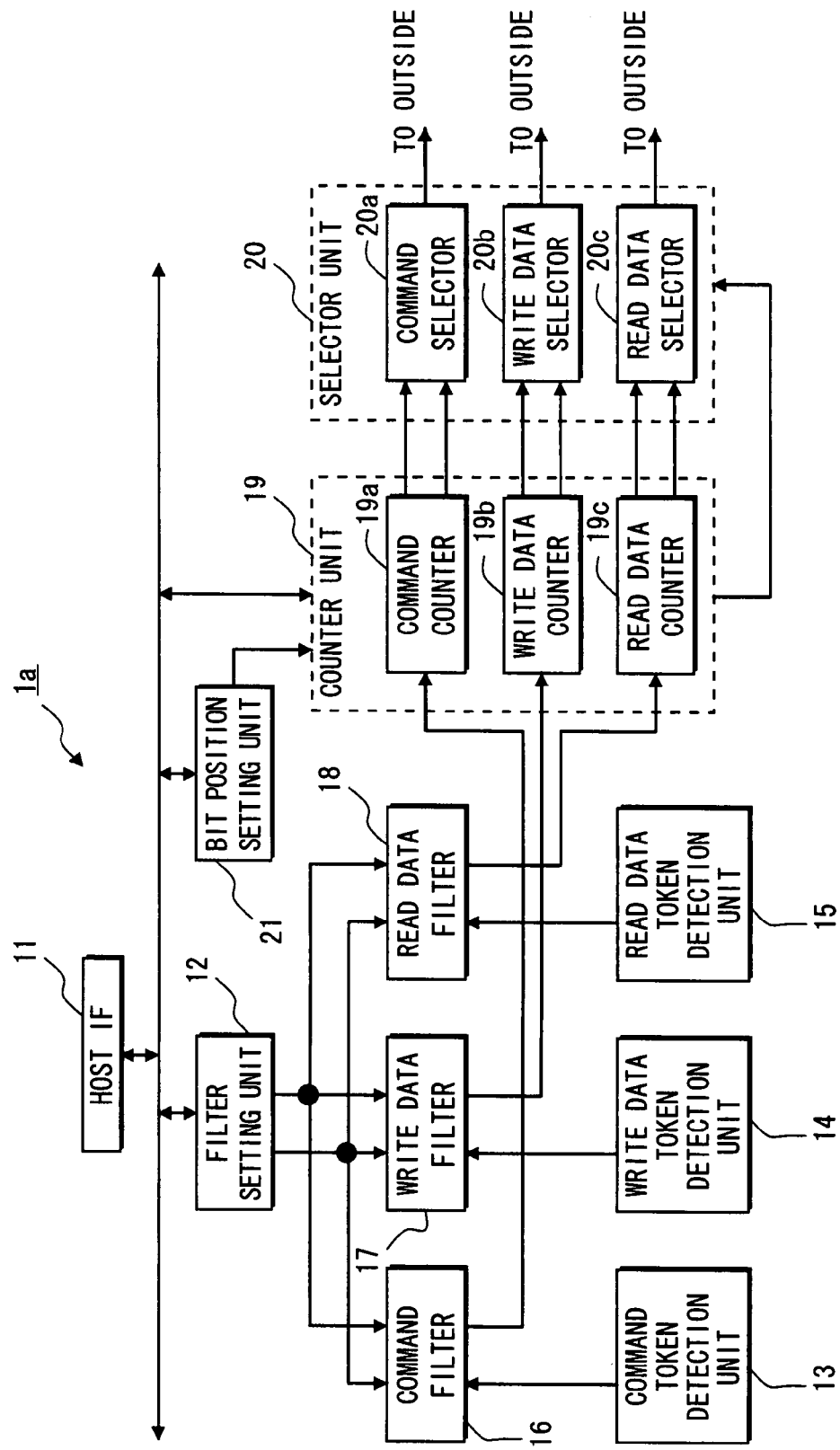
FIG. 6 shows a construction of a system performance profiling device according to the second embodiment.

A construction of a system performance profiling device according to the second embodiment is described below, with reference to FIG. 6. FIG. 6 shows the construction of the system performance profiling device according to the second embodiment. In the second embodiment, construction elements which are the same as those in the first embodiment have been given the same reference numerals and their explanation has been omitted.

A system performance profiling device 1a includes the host IF 11, the filter setting unit t12, the command token detection unit 13, the write data token detection unit 14, the read data token detection unit 15, the command filter 16, the write data filter 17, the read data filter 18, the counter unit 19, the selector unit 20, and a bit position setting unit 21.

The bit position setting unit 21 sets the first output bit position of the command counter 19a, to a bit position designated via the host IF 1. The bit position setting unit 21 also sets the second output bit position of the write data counter 19b, to a bit position designated via the host IF 11. The bit position setting unit 21 further sets the third output bit position of the read data counter 19c, to a bit position designated via the host IF 11. The bit position of each counter set by the bit position setting unit 21 need not be the same.

The command counter 19a outputs a value of the first output bit position set by the bit position setting unit 21 and values (a first counter value) of all bit positions lower than the first output bit position, to the command selector 20a.

The write data counter 19b outputs a value of the second output bit position set by the bit position setting unit 21 and values (a second counter value) of all bit positions lower than the second output bit position, to the write data selector 20b.

The read data counter 19c outputs a value of the third output bit position set by the bit position setting unit 21 and values (a third counter value) of all bit positions lower than the third output bit position, to the read data selector 20c.

Third Embodiment

The following describes a third embodiment of the present invention, with reference to drawings.

The third embodiment adds the following two mechanisms to the system performance profiling device 1a of the second embodiment: a mechanism of counting, in each data counter, only data tokens corresponding to commands which occur during the profiling data acquisition period; and a mechanism of outputting the number of commands corresponding to data transfers which have not been completed, to the outside after the profiling data acquisition period ends.

Here, a SoC in which a system performance profiling device 1b is provided includes a pipeline protocol. The same applies to a fourth embodiment.

<Overview>

Figure 7:
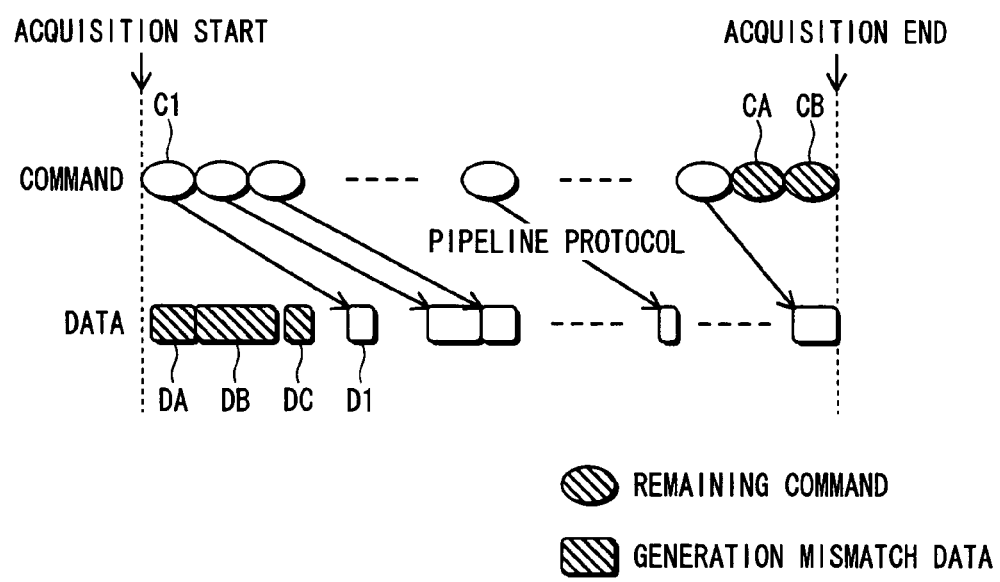
FIG. 7 illustrates an overview of a third embodiment.

An overview of the third embodiment is described below, with reference to FIG. 7. FIG. 7 illustrates the overview of the third embodiment.

In a system performance profiling device according to the third embodiment, each data counter does not count data DA, DB, and DC corresponding to commands that occur before the acquisition of profiling data for evaluating system performance starts, and starts counting from data D1 corresponding to command C1 that occurs after the acquisition starts.

After this, the number of commands CA and CB corresponding to data transfers which have not been completed when the acquisition ends is output to the outside.

<Signal on an On-Chip Bus>

Figure 8:
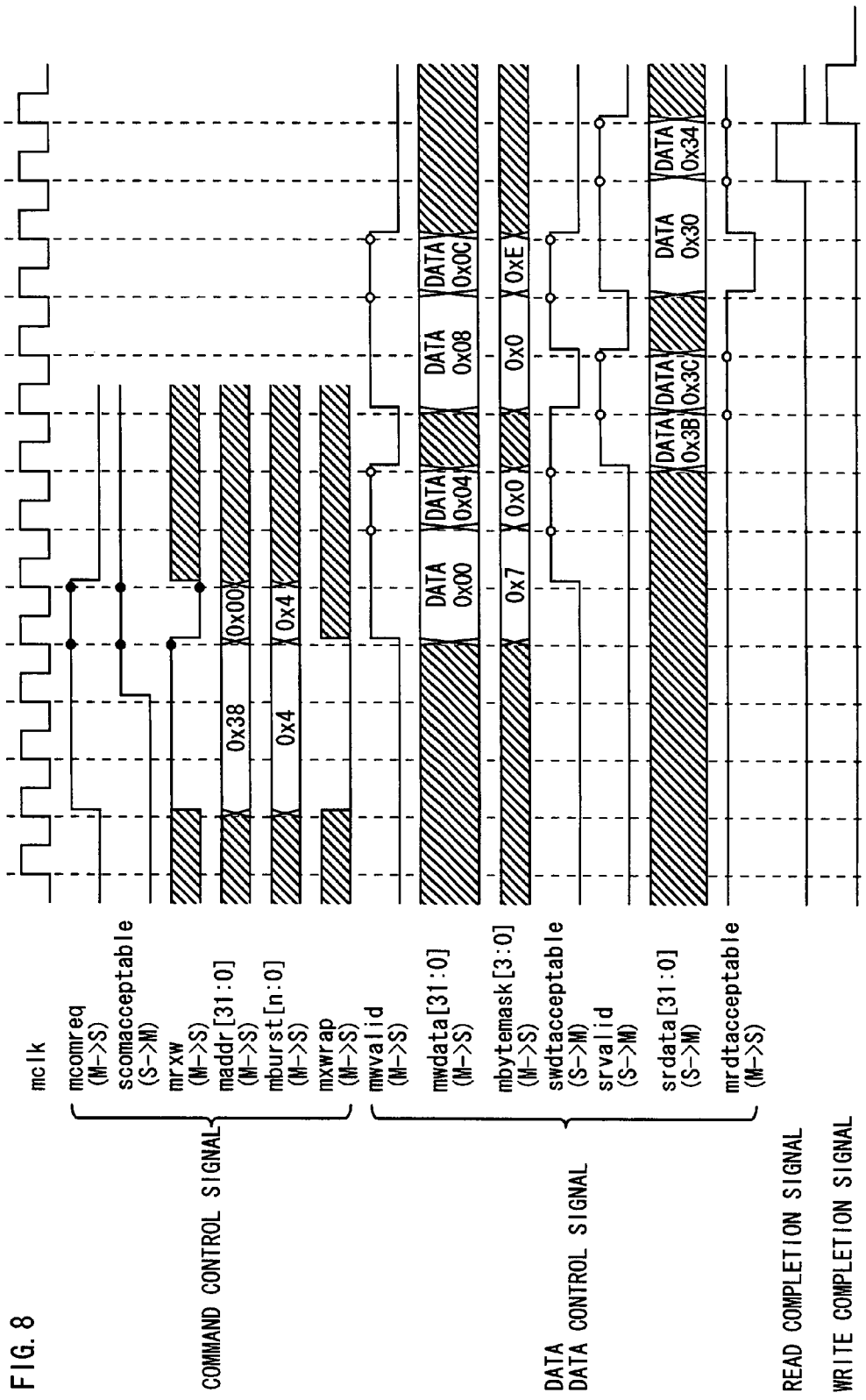
FIG. 8 shows signals on an on-chip bus according to the third and fourth embodiments.

Signals on an on-chip bus are described below, with reference to FIG. 8. FIG. 8 shows signals on an on-chip bus to which the third and fourth embodiments relate.

In addition to the signals on the on-chip bus in the first and second embodiments, a read completion signal and a write completion signal on the on-chip bus are used in the third and fourth embodiments.

<Construction>

Figure 9:
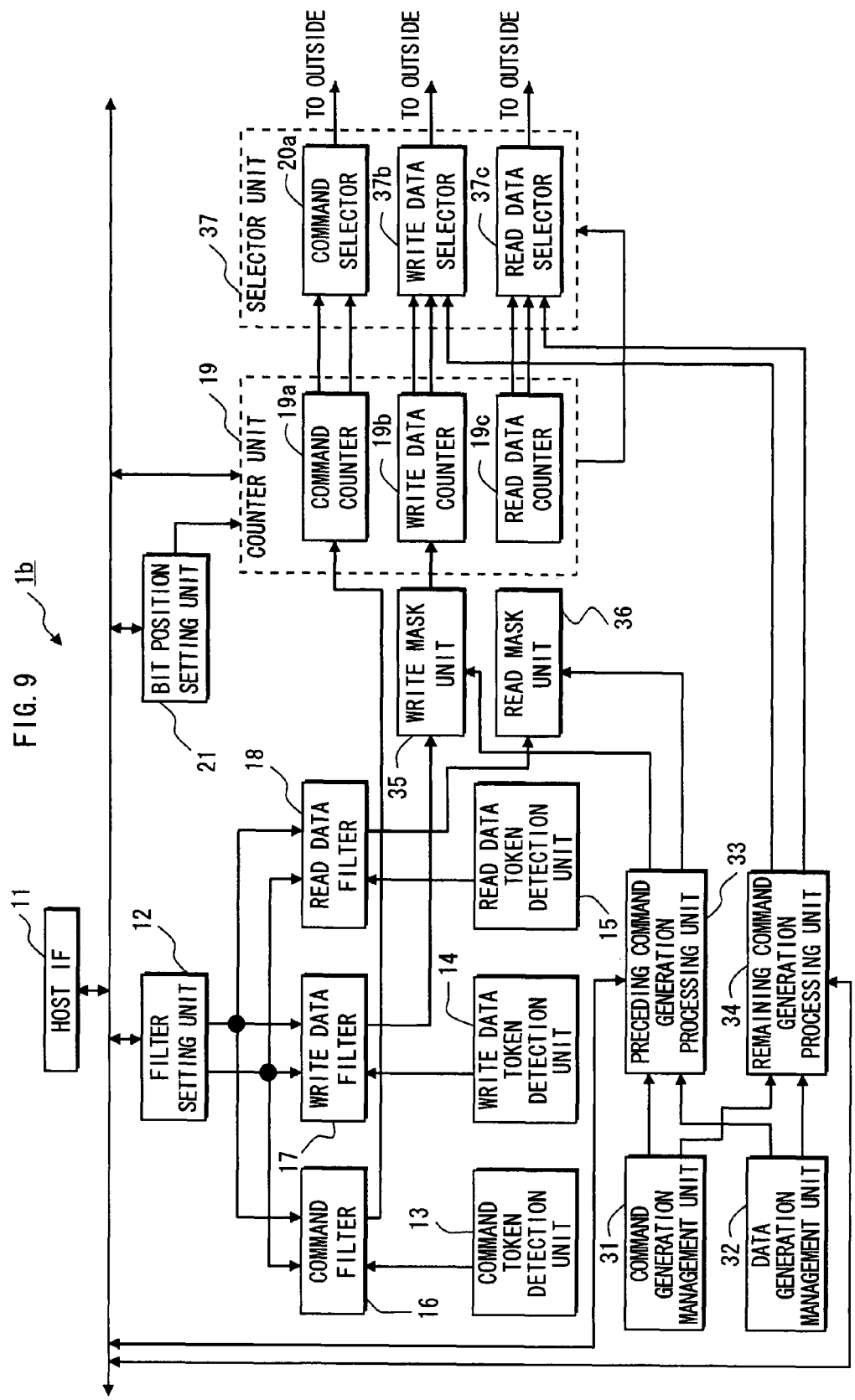
FIG. 9 shows a construction of a system performance profiling device according to the third embodiment.

A construction of the system performance profiling device according to the third embodiment is described below, with reference to FIG. 9. FIG. 9 shows the construction of the system performance profiling device according to the third embodiment. In the third embodiment, construction elements which are the same as those in the first and second embodiments have been given the same reference numerals and their explanation has been omitted.

The system performance profiling device 1b includes the host IF 11, the filter setting unit 12, the command token detection unit 13, the write data token detection unit 14, the read data token detection unit 15, the command filter 16, the write data filter 17, the read data filter 18, a command generation management unit 31, a data generation management unit 32, a preceding command generation processing unit t33, a remaining command generation processing unit 34, a write mask unit 35, a read mask unit 36, the counter unit 19, a selector unit 37, and the bit position setting unit 21.

The command generation management unit 31 detects a read command at a leading edge of the master clock mclk when the command request signal mcomreq is high, the command acceptability signal scomacceptable is high, and the read write signal mrxw is high, and generates a read command event signal. The command generation management unit 31 counts the number of occurrences of the read command event signal, using a read command counter equipped therein.

Also, the command generation management unit 31 detects a write command at a leading edge of the master clock mclk when the command request signal mcomreq is high, the command acceptability signal scomacceptable is high, and the read write signal mrxw is low, and generates a write command event signal. The command generation management unit 31 counts the number of occurrences of the write command event signal, using a write command counter equipped therein.

Note here that the command generation management unit 31 is operating before the profiling data acquisition starts.

The data generation management unit 32 counts the number of leading edges of the read completion signal using a read data counter equipped therein, and the number of leading edges of the write completion signal using a write data counter equipped therein. Note here that the data generation management unit 32 is operating before the profiling data acquisition starts.

The preceding command generation processing unit 33, when the acquisition start signal to start the profiling data acquisition is input via the host IF 11, retrieves a counter value (hereafter referred to as a preceding read command comparison value) of the read command counter and a counter value (hereafter referred to as a preceding write command comparison value) of the write command counter in the command generation management unit 31 at the time when the acquisition start signal is input, and holds the retrieved preceding read command comparison value and preceding write command comparison value.

The preceding command generation processing unit 33 outputs a low-level signal to the write mask unit 35 so as to mask the write data event signal in the write mask unit 35, until the counter value of the write data Counter in the data generation management unit 32 matches the preceding write command comparison value held therein for the first time (i.e. until data transfers corresponding to all write commands that occur before the acquisition starts are completed). After the counter value of the write data counter matches the preceding write command comparison value, the preceding command generation processing unit 33 outputs a high-level signal to the write mask unit 35, so as not to mask the write data event signal in the write mask unit 35.

The preceding command generation processing unit 33 outputs a low-level signal to the read mask unit 36 so as to mask the read data event signal in the read mask unit 36, until the counter value of the read data counter in the data generation management unit 32 matches the preceding read command comparison value held therein for the first time (i.e.

until data transfers corresponding to all read commands that occur before the acquisition starts are completed). After the counter value of the read data counter matches the preceding read command comparison value, the preceding command generation processing unit 33 outputs a high-level signal to the read mask unit 36, so as not to mask the read data event signal in the read mask unit 36.

The remaining command generation processing unit 34 performs the following process, when the filter parameter is the counting of events of both write transactions and read transactions or the counting of events of read transactions.

When the acquisition end signal to end the profiling data acquisition is input via the host IF 11, the remaining command generation processing unit 34 subtracts the counter value of the read data counter in the data generation management unit 32, from the counter value of the read command counter in the command generation management unit 31 at the time when the acquisition end signal is input. The remaining command generation processing unit 34 outputs a result of the subtraction (hereafter referred to as a remaining read command number) to a read data selector 37c.

The remaining command generation processing unit 34 performs the following process, when the filter parameter is the counting of events of both write transactions and read transactions or the counting of events of write transactions.

When the acquisition end signal to end the profiling data acquisition is input via the host IF 11, the remaining command generation processing unit 34 subtracts the counter value of the write data counter in the data generation management unit 32, from the counter value of the write command counter in the command generation management unit 31 at the time when the acquisition end signal is input. The remaining command generation processing unit 34 outputs a result of the subtraction (hereafter referred to as a remaining write command number) to a write data selector 37b.

The write mask unit 35 masks the write data event signal to make it low, and outputs the resulting signal to a circuit block of a subsequent stage, during when the low-level signal is input from the preceding command generation processing unit 33. The write mask unit 35 outputs the write data event signal directly to the circuit block of the subsequent stage, during when the high-level signal is input from the preceding command generation processing unit 33.

The read mask unit 36 masks the read data event signal to make it low, and outputs the resulting signal to a circuit block of a subsequent stage, during when the low-level signal is input from the preceding command generation processing unit 33. The read mask unit 36 outputs the read data event signal directly to the circuit block of the subsequent stage, during when the high-level signal is input from the preceding command generation processing unit 33.

The selector unit 37 includes the command selector 20a, the write data selector 37b, and the read data selector 37c.

The write data selector 37b, when the first selection instruction signal is input from the counter unit 19, selects the value of the second output bit position input from the write data counter 19b, and outputs the selected value to the outside. When the second selection instruction signal is input from the counter unit 19, the write data selector 37b selects the second output counter value input from the write data counter 19b and outputs the selected value to the outside, and then selects the remaining write command number input from the remaining command generation processing unit 34 and outputs it to the outside.

The read data selector 37c, when the first selection instruction signal is input from the counter unit 19, selects the value of the third output bit position input from the read data counter 19c, and outputs the selected value to the outside. When the second selection instruction signal is input from the counter unit 19, the read data selector 37c selects the third output counter value input from the read data counter 19c and outputs the selected value to the outside, and then selects the remaining read command number input from the remaining command generation processing unit 34 and outputs it to the outside.

<Operation>

The following describes an operation of the system performance profiling device shown in FIG. 9.

The command generation management unit 31 and the data generation management unit 32 are operating before the profiling data acquisition for evaluating system performance starts.

When the acquisition start signal is input, the counter unit 19 starts operation, and outputs the first selection instruction signal to the selector unit 37. When the first selection instruction signal is input in the selector unit 37, the command selector 20a, the write data selector 37b, and the read data selector 37c respectively select the value of the first output bit position of the command counter 19a, the value of the second output bit position of the write data counter 19b, and the value of the third output bit position of the read data counter 19c, and output them to the outside.

Until data transfers corresponding to all write commands that occur before the acquisition starts are completed, the preceding command generation processing unit 33 outputs the low-level signal to the write mask unit 35, and the write mask unit 35 masks the write data event signal. After this, when the data transfers corresponding to all write commands that occur before the acquisition starts are completed, the preceding command generation processing unit 33 outputs the high-level signal to the write mask unit 35, and the write mask unit 35 outputs the write data event signal directly to the circuit block of the subsequent stage.

Also, until data transfers corresponding to all read commands that occur before the acquisition starts are completed, the preceding command generation processing unit 33 outputs the low-level signal to the read mask unit 36, and the read mask unit 36 masks the read data event signal. After this, when the data transfers corresponding to all read commands that occur before the acquisition starts are completed, the preceding command generation processing unit 33 outputs the high-level signal to the read mask unit 36, and the read mask unit 36 outputs the read data event signal directly to the circuit block of the subsequent block.

When the acquisition end signal is input, the remaining command generation processing unit 34 calculates the remaining write command number and the remaining read command number. Also, when the acquisition end signal is input, the counter unit 19 stops the counting operation, and outputs the second selection instruction signal to the selector unit 37.

When the second selection instruction signal is input in the selector unit 37, the command selector 20a selects the first output counter value of the command counter 19a and outputs it to the outside. Also, the write data selector 37b selects the second output counter value of the write data counter 19b and outputs it to the outside, and then selects the remaining write command number and outputs it to the outside. Further, the read data selector 37c selects the third output counter value of the read data counter 19c and outputs it to the outside, and then selects the remaining read command number and outputs it to the outside.

Fourth Embodiment

The following describes the fourth embodiment of the present invention, with reference to drawings.

In the third embodiment, the number of commands corresponding to data transfers that have not been completed when the profiling data acquisition for evaluating system performance ends is output to the outside. In the fourth embodiment, on the other hand, if there is a command corresponding to a data transfer which has not been completed at the end of the profiling data acquisition, the data token detection and the data event signal counting operation based on the data token detection are continued until a data transfer corresponding to that command is completed.

<Overview>

Figure 10:
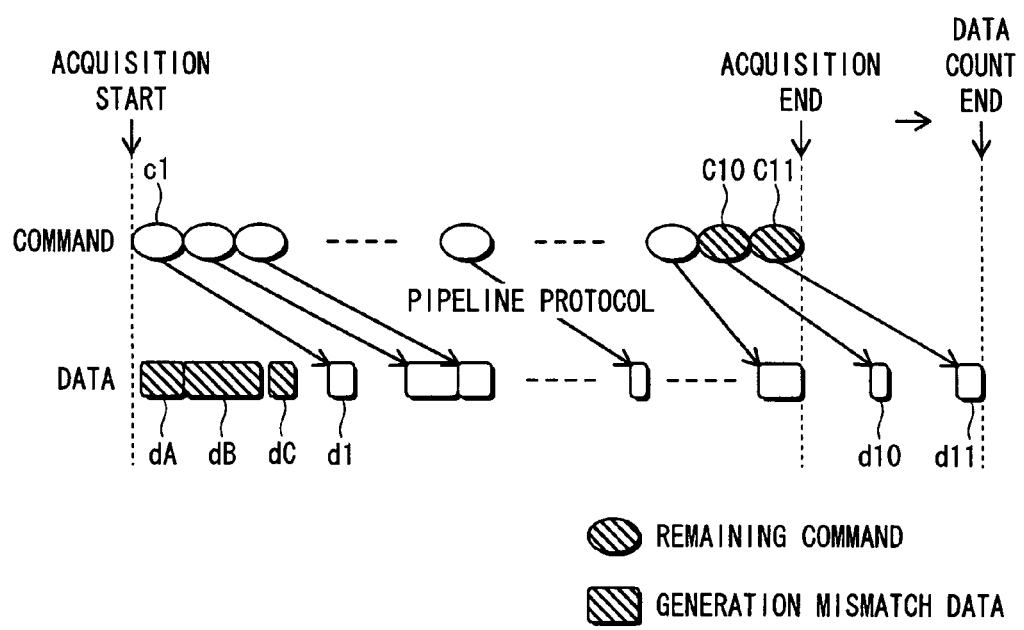
FIG. 10 illustrates an overview of the fourth embodiment.

An overview of the fourth embodiment is described below, with reference to FIG. 10. FIG. 10 illustrates the overview of the fourth embodiment.

In a system performance profiling device according to the fourth embodiment, each data counter does not count data dA, dB, and dC corresponding to commands that occur before the profiling data acquisition for evaluating system performance starts, and starts counting from data dl corresponding to command cl that occurs after the profiling data acquisition starts.

When data d10 and d11 corresponding to commands c10 and c11 whose data transfers have not been completed at the end of the acquisition among the commands that occur after the start of the acquisition are detected, each data counter stops the counting operation.

<Construction>

A construction of the system performance profiling device according to the fourth embodiment is described below, with reference to FIG. 11. FIG. 11 shows the construction of the system performance profiling device according to the fourth embodiment. In the fourth embodiment, construction elements which are the same as those in the first to third embodiments have been given the same reference numerals, and their explanation has been omitted.

A system performance profiling device 1c includes the host IF 11, the filter setting unit 12, the command token detection unit 13, the write data token detection unit 14, the read data token detection unit 15, the command filter 16, the write data filter 17, the read data filter 18, the command generation management unit 31, the data generation management unit 32, the preceding command generation processing unit 33, a remaining command generation processing unit 41, the write mask unit 35, the read mask unit 36, a counter unit 42, the selector unit 20, and the bit position setting unit 21.

The remaining command generation processing unit 41 performs the following process, when the filter parameter is the counting of events of both write transactions and read transactions or the counting of events of read transactions.

When the acquisition end signal to end the profiling data acquisition is input via the host IF 11, the remaining command generation processing unit 41 retrieves the counter value (hereafter referred to as a remaining read command comparison value) of the read command counter in the command generation management unit 31 at the time when the acquisition end signal is input, and holds the retrieved value. When the counter value of the read data counter in the data generation management unit 32 matches the remaining read command comparison value held therein for the first time (i.e. when data transfers corresponding to all read commands that occur before the acquisition ends are completed), the remaining command generation processing unit 41 outputs a read data counter stop signal to the counter unit 42. Also, in the case where the filter parameter is the counting of events of read transactions, when the acquisition end signal is input via the host IF 11, the remaining command generation processing unit 41 outputs a write data counter stop signal to the counter unit 42.

The remaining command generation processing unit 41 performs the following process, when the filter parameter is the counting of events of both write transactions and read transactions or the counting of events of write transactions.

When the acquisition end signal to end the profiling data acquisition is input via the host IF 11, the remaining command generation processing unit 41 retrieves the counter value (hereafter referred to as a remaining write command comparison value) of the write command counter in the command generation management unit 31 at the time when the acquisition end signal is input, and holds the retrieved value. When the counter value of the write data counter in the data generation management unit 32 matches the remaining write command comparison value held therein for the first time (i.e. when data transfers corresponding to all write commands that occur before the acquisition ends are completed), the remaining command generation processing unit 41 outputs a write data counter-stop signal to the counter unit 42. Also, in the case where the filter parameter is the counting of events of write transactions, when the acquisition end signal is input via the host IF 11, the remaining command generation processing unit 41 outputs a read data counter stop signal to the counter unit 42.

The counter unit 42 includes the command counter 19a, a write data counter 42b, and a read data counter 42c. The write data counter 42b and the read data counter 42c are respectively the same as the write data counter 19b and the read data counter 19c except for the counting operation stop timing.

The write data counter 42b stops the counting operation, when the write data counter stop signal is input from the remaining command generation processing unit 41. The read data counter 42c stops the counting operation, when the read data counter stop signal is input from the remaining command generation processing unit 41.

When the acquisition start signal is input from the host IF 11, the counter unit 42 outputs the first selection instruction signal to the selector unit 20. When the acquisition end signal is input from the host IF 11 and the write data counter stop signal and the read data counter stop signal are input from the remaining command generation processing unit 41, the counter unit 42 outputs the second selection instruction signal to the selector unit 20.

<Operation>

An operation of the system performance profiling device shown in FIG. 11 is described below.

The command generation management unit 31 and the data generation management unit 32 are operating before the profiling data acquisition for evaluating system performance starts.

When the acquisition start signal is input, the counter unit 42 starts operation, and outputs the first selection instruction signal to the selector unit 20. When the first selection instruction signal is input in the selector unit 20, the command selector 20a, the write data selector 20b, and the read data selector 20c respectively select the value of the first output bit position of the command counter 19a, the value of the second output bit position of the write data counter 42b, and the value of the third output bit position of the read data counter 42c, and output them to the outside.

Until data transfers corresponding to all write commands that occur before the start of the acquisition are completed, the preceding command generation processing unit 33 outputs the low-level signal to the write mask unit 35, and the write mask unit 35 masks the write data event signal. After this, when the data transfers corresponding to all write commands that occur before the start of the acquisition are completed, the preceding command generation processing unit 33 outputs the high-level signal to the write mask unit 35, and the write mask unit 35 outputs the write data event signal directly to the circuit block of the subsequent stage.

Also, until data transfers corresponding to all read commands that occur before the start of the acquisition are completed, the preceding command generation processing unit 33 outputs the low-level signal to the read mask unit 36, and the read mask unit 36 masks the write data event signal. After this, when the data transfers corresponding to all read commands that occur before the start of the acquisition are completed, the preceding command generation processing unit 33 outputs the high-level signal to the read mask unit 36, and the read mask unit 36 outputs the write data event signal directly to the circuit block of the subsequent stage.

When the acquisition end signal is input in the counter unit 42, the command counter 19*a* stops the counting operation.

When data transfers corresponding to all write commands that occur before the acquisition end signal is input are completed, the remaining command generation processing unit 41 outputs the write data counter stop signal to the counter unit 42, and the write data counter 42*b* stops the counting operation.

Also, when data transfers corresponding to all read commands that occur before the acquisition end signal is input are completed, the remaining command generation processing unit 41 outputs the read data counter stop signal to the counter unit 42, and the read data counter 42*c* stops the counting operation.

After all of the acquisition end signal, the write data counter stop signal, and the read data counter stop signal are input, the counter unit 42 outputs the second selection instruction signal to the selector unit 20.

When the second selection instruction signal is input in the selector unit 20, the command selector 20*a* selects the first output counter value of the command counter 19*a*, and outputs it to the outside. Also, the write data selector 20*b* selects the second output counter value of the write data counter 42*b*, and outputs it to the outside. Further, the read data selector 20*c* selects the third output counter value of the read data counter 42*c*, and outputs it to the outside.

<<Supplemental Remarks>>

(1) Each of the above embodiments describes a write transaction and a read transaction as example bus transactions, but this is not a limit for the present invention, which can equally be applicable to other transactions.

(2) Each of the above embodiments describes the case where, when the second selection instruction signal is input from the counter unit, the selectors in the selector unit automatically select the first output counter value, the second output counter value, and the third output counter value and output them to the outside. However, the present invention is not limited to this. For example, the selectors may select the first output counter value, the second output counter value, and the third output counter value and output them to the outside based on an instruction signal from an external device that is used by an operator.

(3) The third embodiment describes the case where the write data selector 37*b* outputs the second output counter value to the outside and then outputs the remaining read command number to the outside, but these outputs can be performed in reverse order. The same applies to the read data selector 37*c*.

(4) Each of the above embodiments describes the case where the command counter outputs the values of all bit positions lower than the first output bit position to the command selector, but the present invention is not limited to such. For example, the command counter may output a plurality of bit positions including all bit positions lower than the first output bit position, to the command selector. The same applies to the write data counter and the read data counter.

(5) The third embodiment describes the case where the remaining write command number and the remaining read command number are respectively output from the write data selector 37*b* and the read data selector 37*c*, but this can be modified as follows. The remaining command generation processing unit 34 outputs the remaining write command number and the remaining read command number to the command selector 20*a*. After the profiling data acquisition ends, the command selector 20*a* outputs the remaining write command number and the remaining read command number to the outside before or after outputting the first output counter value.

INDUSTRIAL APPLICABILITY

The present invention can be used for evaluating system performance of, for example, system LSIs used for digital AV devices, in a development stage or as commercial products.

The invention claimed is:

1. A system performance profiling device that is integrated inside a system-on-chip, monitors a signal on a bus inside the system-on-chip, acquires profiling data for evaluating system performance of the system-on-chip, and outputs the profiling data to an outside of the system-on-chip, the system performance profiling device comprising:
 a command detection unit operable to detect a command occurrence by monitoring the signal on the bus;
 a data detection unit operable to detect a data transfer by monitoring the signal on the bus;
 a first counter unit operable to count a number of command occurrences based on a result of the detection by the command detection unit;
 a second counter unit operable to count a number of data transfers based on a result of the detection by the data detection unit;
 a first selector unit operable to output a value of a first bit position, which is one bit position of the first counter unit, to the outside of the system-on-chip during a period of acquisition of the profiling data, and output a value of each lower bit position of the first counter unit than the first bit position to the outside of the system-on-chip after the acquisition of the profiling data ends; and
 a second selector unit operable to output a value of a second bit position, which is one bit position of the second counter unit, to the outside of the system-on-chip during the period of the acquisition of the profiling data, and output a value of each lower bit position of the second counter unit than the second bit position to the outside of the system-on-chip after the acquisition of the profiling data ends.

2. The system performance profiling device of claim 1, further comprising:
 a bit position setting unit operable to set the first bit position of the first counter unit.

3. The system performance profiling device of claim 1, further comprising:
   a bit position setting unit operable to set the second bit position of the second counter unit.

4. The system performance profiling device of claim 1, further comprising:
   a counting suppression unit operable to suppress the counting by the second counter unit, until data transfers corresponding to all commands that occur before the acquisition of the profiling data starts are completed.

5. The system performance profiling device of claim 4, wherein
   after the acquisition of the profiling data ends, the second selector unit outputs a number of commands corresponding to data transfers that have not been completed at a time when the acquisition of the profiling data ends, to the outside of the system-on-chip before or after outputting the value of each lower bit position of the second counter unit than the second bit position.

6. The system performance profiling device of claim 4, wherein
   after the acquisition of the profiling data ends, the first selector unit outputs a number of commands corresponding to data transfers that have not been completed at a time when the acquisition of the profiling data ends, to the outside of the system-on-chip before or after outputting the value of each lower bit position of the first counter unit than the first bit position.

7. The system performance profiling device of claim 4, wherein
   the data detection unit and the second counter unit continue respective operations until data transfers corresponding to all commands that occur after the acquisition of the profiling data starts are completed, and
   the second selector unit outputs the value of the second bit position to the outside of the system-on-chip until the data transfers corresponding to all commands that occur after the acquisition of the profiling data starts are completed, and outputs the value of each lower bit position of the second counter unit than the second bit position to the outside of the system-on-chip after the data transfers corresponding to all commands that occur after the acquisition of the profiling data starts are completed.

8. The system performance profiling device of claim 1, further comprising:
   a condition setting unit operable to set a condition for a bus transaction that is subjected to the acquisition of the profiling data,
   wherein the first counter unit counts a number of occurrences of commands that satisfy the condition set by the condition setting unit, and
   the second counter unit counts a number of data transfers that satisfy the condition set by the condition setting unit.

* * * * *